US007002268B2

(12) United States Patent
Nagatsuka

(10) Patent No.: US 7,002,268 B2
(45) Date of Patent: Feb. 21, 2006

(54) SPINDLE MOTOR

(75) Inventor: Osamu Nagatsuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 723 days.

(21) Appl. No.: 10/195,413

(22) Filed: Jul. 16, 2002

(65) Prior Publication Data
US 2003/0020341 A1 Jan. 30, 2003

(30) Foreign Application Priority Data
Jul. 24, 2001 (JP) ............................. 2001-223250

(51) Int. Cl.
H02K 7/00 (2006.01)
G11B 17/02 (2006.01)
(52) U.S. Cl. ..................... 310/67 R; 360/99.08; 310/91
(58) Field of Classification Search ............. 310/67 R, 310/66, 91, 51; 360/99.08
See application file for complete search history.

(56) References Cited

U.S. PATENT DOCUMENTS

| 4,707,751 | A | * | 11/1987 | Ozaki et al. | ............. | 360/99.08 |
| 5,379,439 | A | * | 1/1995 | Harrison et al. | ........... | 360/72.1 |
| 5,452,157 | A | * | 9/1995 | Chow et al. | ............. | 360/98.08 |
| 5,555,144 | A | * | 9/1996 | Wood et al. | ............. | 360/99.08 |
| 5,834,868 | A | * | 11/1998 | Yoshikawa et al. | ........ | 310/67 R |
| 6,087,749 | A | * | 7/2000 | Ishizuka | ....................... | 310/91 |
| 6,205,110 | B1 | * | 3/2001 | Miyamoto et al. | ....... | 360/99.08 |
| 6,222,700 | B1 | * | 4/2001 | Martin et al. | ............ | 360/98.08 |
| 6,414,777 | B1 | * | 7/2002 | Miyamoto | ............... | 360/99.08 |

* cited by examiner

Primary Examiner—Nestor Ramirez
Assistant Examiner—Guillermo Perez
(74) Attorney, Agent, or Firm—Fitzpatrick, Cella, Harper & Scinto

(57) ABSTRACT

A spindle motor adapted to be loaded with a disk provided with an attracted plate and to rotate the disk is provided which comprises a turn table having a flange portion on a front surface of which the disk is to be mounted and on a back surface of which a rotor yoke is supported, and a cylindrical portion a distal end of which is to be opposed to the attracted plate, the turn table being supported on a housing of a stator through a rotational shaft; an attraction magnet fixed to the distal end of the cylindrical portion of the turn table, and an aligning member an inner periphery of which is engaged with an outer periphery of the cylindrical portion and an outer periphery of which is to be brought into contact with an inner periphery of a center hole of the disk to align the disk; and an urging member interposed between the aligning member and the flange portion of the turn table to urge the aligning member by restoration force, wherein the urging member is comprised of an annular spring material with a plurality of peaks in wave shape.

5 Claims, 4 Drawing Sheets

SPINDLE MOTOR

BACKGROUND OF THE INVENTION

1. Field of the Invention

The present invention relates to a spindle motor, for example, loaded with an optical disk such as a mini disk (MD) or the like and operating to drive it.

2. Related Background Art

FIG. 4 is a longitudinal sectional view showing an example of a conventional spindle motor loaded with a disk of relatively large diameter (Φ120) such as a CD, a DVD, or the like, and this spindle motor 20 is composed of a stator section 21 as a fixed section, and a rotor section 22 supported as rotatable relative to the stator section 21 and loaded with the optical disk.

Among these, the stator section 21 is composed of a stator board 23 as a fixture member of this spindle motor 20, a cylindrical housing 24 a lower end of which is fixed in an insert hole in the central region of the stator board 23, a laminated iron core 25 fitted on the outer periphery of the housing 24, a plurality of coils 26 wound on the laminated iron core 25, a sliding bearing 27 pressed into the housing 24, a thrust receiver 24a inserted and fixed in the lower end of the housing 24, and so on.

On the other hand, the rotor section 22 is generally composed of a rotational shaft 28 which is inserted in the sliding bearing 27 and the lower end of which is supported by the thrust receiver 24a, a turn table 29 of approximate disk shape having a longitudinal section of approximately anastatic (凸) shape in which the upper half of the rotational shaft 28 is pressed in the center of a cylindrical portion 29a, a rotor yoke 30 of an approximately anastatic section engaged with a projection formed in the lower center of the turn table 29, the projection being caulked at its outer periphery, an aligning member 32 and an attraction magnet 35 set on the cylindrical portion 29a of the turn table 29, and so on.

Among these components, the rotor yoke 30 is provided with a cylindrical rotor magnet (permanent magnet) 31 the periphery of which is fixed to the inner periphery of the cylindrical portion of the rotor yoke 30 with an adhesive, and this rotor magnet 31 is opposed with a predetermined gap to the outer periphery of the aforementioned laminated iron core 25.

A compression coil spring 33 of a material of a rectangular section is set in a groove formed in a lower surface of the aligning member 32, and the lower end of this compression coil spring 33 is supported by a bottom surface of a groove formed around the lower end of the cylindrical portion 29a of the turn table 29, whereby this compression coil spring 33 is maintained in a compressed state in FIG. 4.

Further, a stopper 34 of annular shape on a plan view is pressed and secured onto a stepped portion formed in an outer peripheral portion at the upper end of the cylindrical portion 29a of the turn table 29, and the annular attraction magnet 35 is set in an annular groove formed at the upper end of the cylindrical portion 29a and is secured with an adhesive.

When the optical disk 36, indicated by chain lines, is mounted on the upper surface of the cylindrical portion 29a of the turn table 29, an inner lower edge of a center hole 36a of the disk is guided in contact with a slant face 32a formed on the outer periphery of the aligning member 32, whereby the optical disk 36 is aligned with the turn table 29 and the rotational shaft 28 through the aligning member 32.

The attraction magnet 35 attracts an attracted plate 38 supported at its outer periphery by a holder 37 mounted on the upper surface of the optical disk 36, whereby the optical disk 36 is maintained in a mounted state while being urged against the turn table 29.

In the spindle motor of this structure, the rotor section 22 is rotated by interaction of magnetic fields generated by energization of the coils 26 and magnetic fields established by the rotor magnet 31 and the rotor yoke 30.

In conjunction therewith, the optical disk 36 is rotated together with the turn table 29 in synchronism with the rotor section 22, while being maintained in the urged state against the turn table 29 by the stopper 37.

In recent optical disk apparatuses equipped with this spindle motor, however, there are demands for further decrease in size and thickness, as is the case with a portable MD or the like, and demands for higher accuracy of positioning of the optical disk in correspondence with increase in density of the optical disk.

SUMMARY OF THE INVENTION

The present invention provides a spindle motor capable of meeting the demands for the higher accuracy of positioning of the optical disk while achieving the decrease in size and thickness.

An example of the spindle motor according to the present invention is as follows.

A spindle motor is adapted to be loaded with a disk provided with an attracted plate and to rotate the disk, and comprises:

a turn table having a flange portion on a front surface of which the disk is to be mounted and on a back surface of which a rotor yoke is supported, and a cylindrical portion a distal end of which is to be opposed to the attracted plate, the turn table being supported on a housing of a stator through a rotational shaft;

an attraction magnet fixed to the distal end of the cylindrical portion of the turn table, and an aligning member an inner periphery of which is engaged with an outer periphery of the cylindrical portion and an outer periphery of which is to be brought into contact with an inner periphery of a center hole of the disk to align the disk; and an urging member interposed between the aligning member and the flange portion of the turn table to urge the aligning member by a restoration force;

wherein the urging member is comprised of an annular spring member with a plurality of peaks in a wave shape.

DESCRIPTION OF THE PREFERRED EMBODIMENTS

Figure 1:
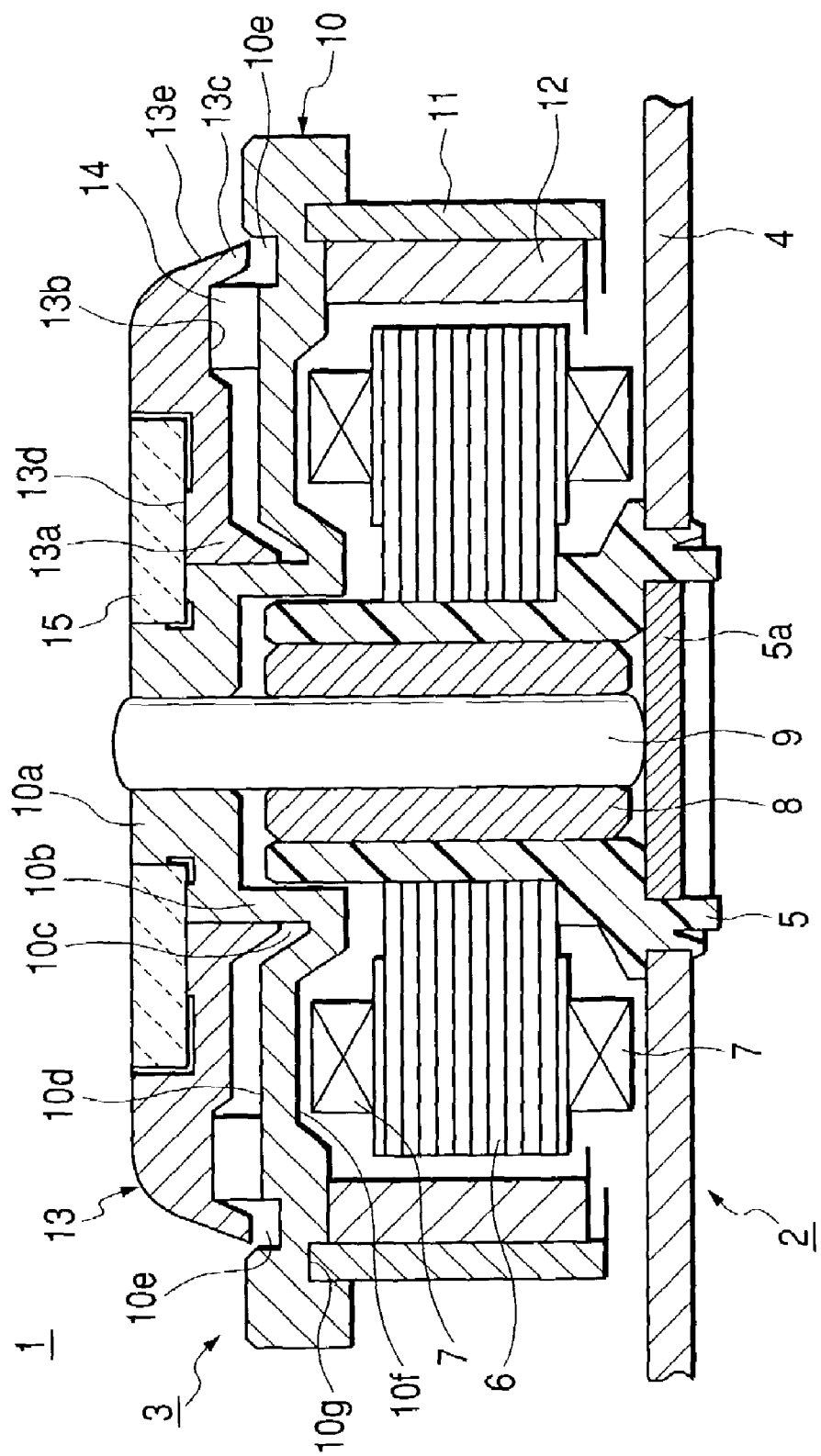
FIG. 1 is a longitudinal sectional view showing a first embodiment of the spindle motor according to the present invention.

Embodiments of the spindle motor according to the present invention will be described below with reference to the drawings. FIG. 1 is a longitudinal sectional view showing a first embodiment of the present invention, and the spindle motor of the present embodiment is different from that described in Related Background Art with FIG. 4, in that the outside diameter of the motor is as small as approximately half, and is particularly different in the shape and function of the turn table 10 and the aligning member 13.

First, this spindle motor 1 is constructed in structure in which the laminated-iron-core-fitting portion of the housing 5, the lower end of which is inserted and fixed in the stator board 4 of the stator section 2, is smaller in diameter and longer in length. As a result, the inside and outside diameters of the laminated iron core 6 are also smaller, and the upper portion of the housing 5 extends up into the turn table 10. Reference symbol 5a designates a thrust receiver as in the conventional motor, numeral 7 coils, and numeral 8 a sliding bearing, this sliding bearing 8 having a larger ratio of fitting length to shaft diameter than the conventional sliding bearing.

The upper part of the rotational shaft 9 fitted in this sliding bearing 8 is pressed into the turn table 10, the turn table 10 has a large cylindrical portion 10b below a small cylindrical portion 10a formed at the upper end, a clearance groove 10c of wedge shape formed around the outer periphery of the lower part of the large cylindrical portion 10b, a flat portion 10d formed on the outer peripheral side of the clearance groove 10c, and a clearance groove 10e formed continuously outside the flat portion 10d.

Among these, the inner peripheral surface of the large cylindrical portion 10b serves as a guide portion while the upper portion of the housing 5 is inserted into the large cylindrical portion 10b. A groove portion 10f of trapezoid shape is formed on the lower surface side of the flat portion 10d and opposite to the upper portions of the coils 7, and a groove portion 10g is formed further on the outer periphery side of the groove portion 10f. An upper end of annular rotor yoke 11 is inserted and fixed in the groove portion 10g, and the rotor magnet 12 is fixed to the inner periphery of the rotor yoke 11 in a state in which the upper end thereof is in close fit with the lower surface of the turn table 10.

As a result, the rotor portion 3 is attracted downward by the magnetism of the rotor magnet 12, so that the lower end of the rotational shaft 9 is always in contact with the thrust receiver 5a.

The aligning member 13 is set as vertically movable on the outer periphery of the large cylindrical portion 10b of the turn table 10, and the aligning member 13 has an annular claw portion 13a vertically formed in the lower part on the inner periphery side. This claw portion 13a is opposed to the clearance groove 10c formed in the turn table 10, and a groove portion 13b of trapezoid shape and a projecting portion 13c are formed continuously outside a flat portion on the outer periphery side of the claw portion 13a. The projecting portion 13c is opposed to the clearance groove 10e of the turn table 10.

Figure 2B:
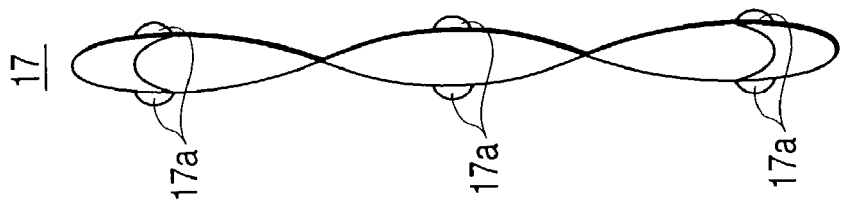
FIG. 2A is a plan view of the urging member employed in the first embodiment of the spindle motor according to the present invention, FIG. 2B a right side view of FIG. 2A, and FIG. 2C a right side view showing the urging member employed in a second embodiment of the spindle motor of the present invention.
Figure 2C:
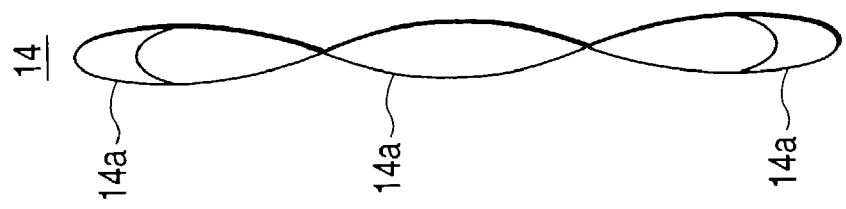
Figure 2A:
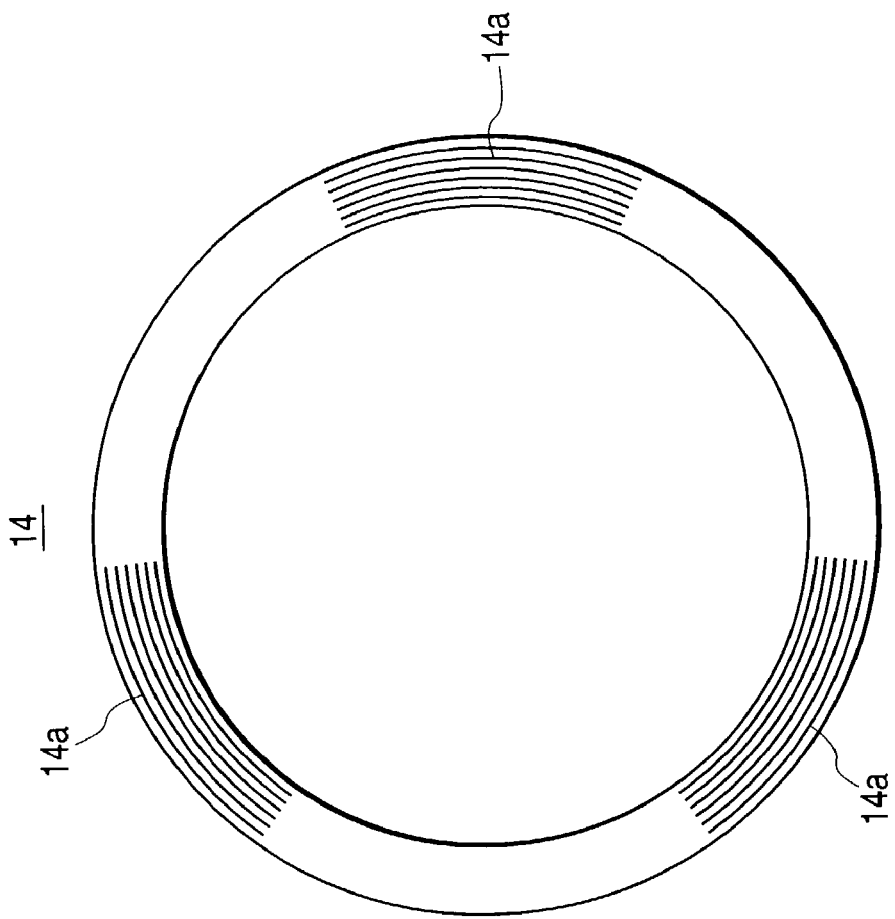

In this structure, the urging member 14, which will be detailed hereinafter with FIGS. 2A–2C, is interposed between the groove portion 13b and the flat portion 10d of the turn table 10, and the position of the urging member 14 is regulated by the inner peripheral side of the groove portion 13b. In the outer peripheral region of the aligning member 13, a slant face portion 13e forming the projecting portion 13c at the lower end is provided as continuous from an arcuate curved portion, and this slant face portion 13e serves as a guide face while the optical disk 16 is mounted as described later.

A stepped portion 13d is formed at the upper end and on the inner periphery side of the aligning member 13, and a wide, thin attraction magnet 15 of annular shape on a plan view (not shown) is fitted between the stepped portion 13d and the outer periphery of the small cylindrical portion 10a of the turn table 10. The inner periphery of the attraction magnet 15 is bonded to the small cylindrical portion 10a with an adhesive. As a result, the aligning member 13 is urged against the lower surface of the attraction magnet 15 via the stepped portion 13d by resilient restoration force of the urging member 14, and the attraction magnet 15 also functions as a stopper for the aligning member 13.

FIG. 2A is a plan view showing the aforementioned urging member 14, and FIG. 2B a right side view of FIG. 2A. This urging member 14 is made of a phosphor bronze sheet for thin spring by punching and press working and in annular and wave shape with three peaks (valleys) 14a at equal intervals. These peaks (valleys) 14a each are in contact with the flat portion 10d of the turn table 10 and the groove portion 13b of the aligning member 13. The reason why the nonmagnetic phosphor bronze sheet is employed herein as a material of the urging member 14 is that it does not affect the magnetic fields generated by the coils 7 and the rotor magnet 12. Therefore, the urging member 14 may be made of any material for spring, such as inexpensive stainless steel SUS304 or the like, as long as it causes little influence on the magnetic fields. FIG. 2C will be described later in the second embodiment.

Figure 3:
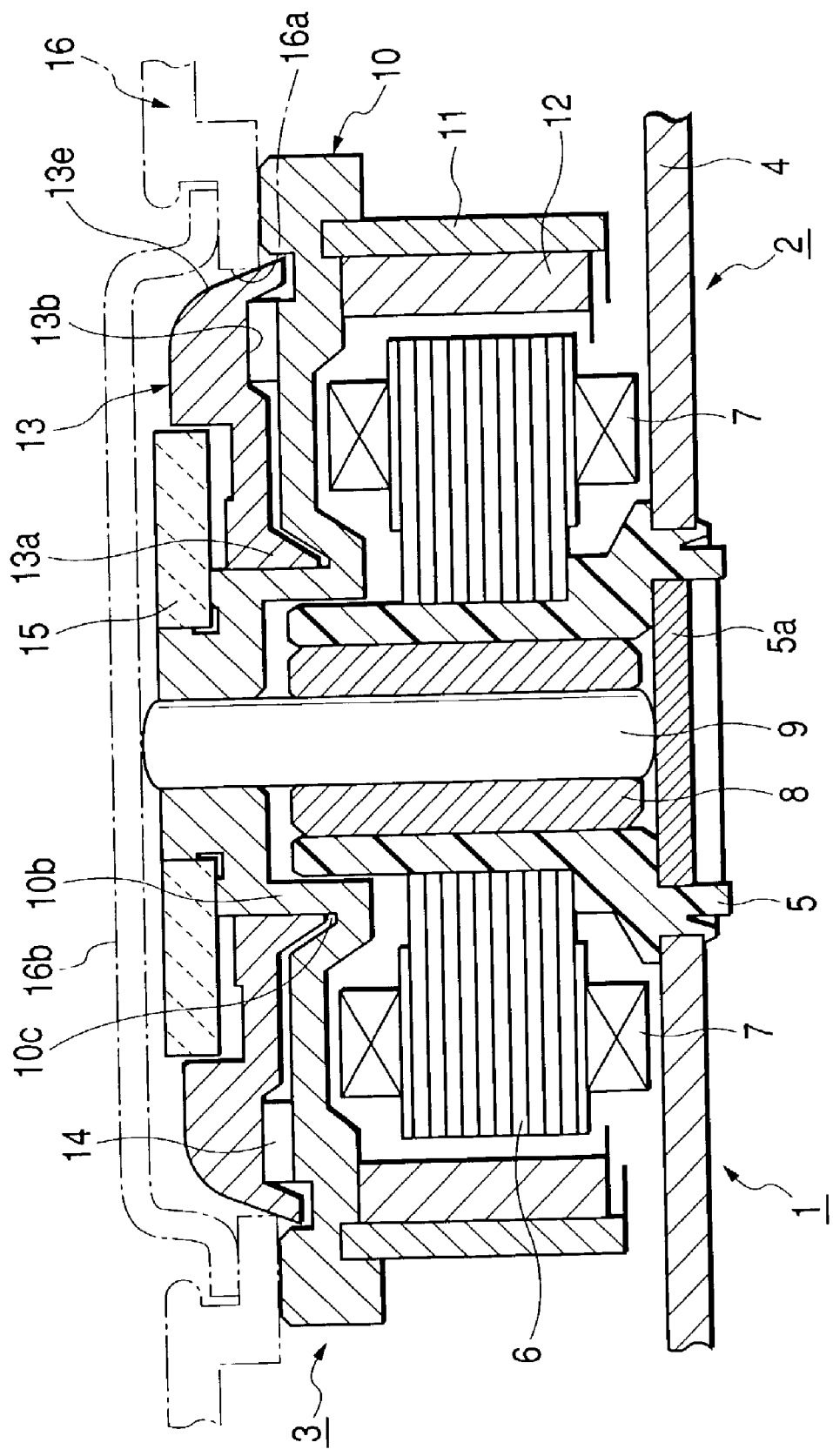
FIG. 3 is a longitudinal sectional view showing the action in the first embodiment of the spindle motor according to the present invention.

The following will describe the action in mounting and holding an optical disk on the spindle motor 1 of the structure as described above, including the longitudinal sectional view of FIG. 3.

While the inner periphery of the center hole 16a is guided by the slant face portion 13e formed in the outer periphery of the aligning member 13, the lower end face of the optical disk 16 comes to be coaxially mounted on the turn table 10, and the attracted plate 16b of the optical disk 16 is attracted by the attraction magnet 15, whereby the optical disk is maintained in the mounted state.

During the mounting process in conjunction with the attracting action, the aligning member 13 is moved down together with the optical disk 16 thereby, and the claw portion 13a is guided by the large cylindrical portion 10b of the turn table 10 to be fitted into the groove 10c of the turn table 10, whereupon the urging member 14 is compressed.

This urging member 14 can be formed in a profile lower than that of the conventional urging member and it is possible to select an arbitrary spring constant, flexure amount, urging force, etc., by changing the dimensions of thickness and inside and outside diameters at arbitrary positions of the turn table 10 and the aligning member 13. In addition, since the aligning member 13 is urged at the three points of the peaks (valleys) 14a of wide span, the urging force can be uniformly exerted on the aligning member 13 during the mounting operation of the optical disk 16, so as to ensure smooth motion while suppressing fluctuation during the down motion.

Namely, since the degree of freedom is large in designing of the urging member 14 and the attraction surface of the attraction magnet 15 is wide enough to increase the attracting force, it is feasible to facilitate setting of the mutual delicate force relation selected under the condition of the attracting force between the attraction magnet 15 and the attracted plate 16a>the repulsive force of the urging member 14 in the mounting process and in the holding state of the optical disk 16, to enhance the alignment performance for the optical disk 16 moved down while being guided by the slant face portion 13e of the aligning member 13, and to increase the holding force after the mounting operation.

In addition, since the degree of freedom is increased in the designing of the urging member 14 and the flexure amount is decreased, it is feasible to decrease the vertical stroke of the aligning member 13 and to decrease the thickness of the spindle motor 1 in correlation with the turn table 10 and the rotor yoke 11 and the shape of the attraction magnet 15.

Further, since the engaging portions of the sliding bearing 8 and the rotational shaft 9 with the housing 5 are long and the housing 5 extends into the large cylindrical portion 10b of the turn table 10, the engagement length of the sliding bearing 8 and the rotational shaft 9 is set large relative to the shaft diameter and the fluctuation of the rotational shaft 8 and the turn table 10 is decreased thereby. As a result, the fluctuation of the aligning member 13 is also suppressed, whereby the alignment accuracy of the optical disk 16 is improved.

Further, the radial position of the urging member 14 can be readily regulated by the groove portion 13b of the aligning member 13. This regulating portion is provided in the aligning member 13 in the embodiment of the present invention, but it may also be provided in the turn table 10. Since the regulation is effected by regulating either the inside or the outside of the urging member 14, the degree of freedom is large in designing.

Figure 4:
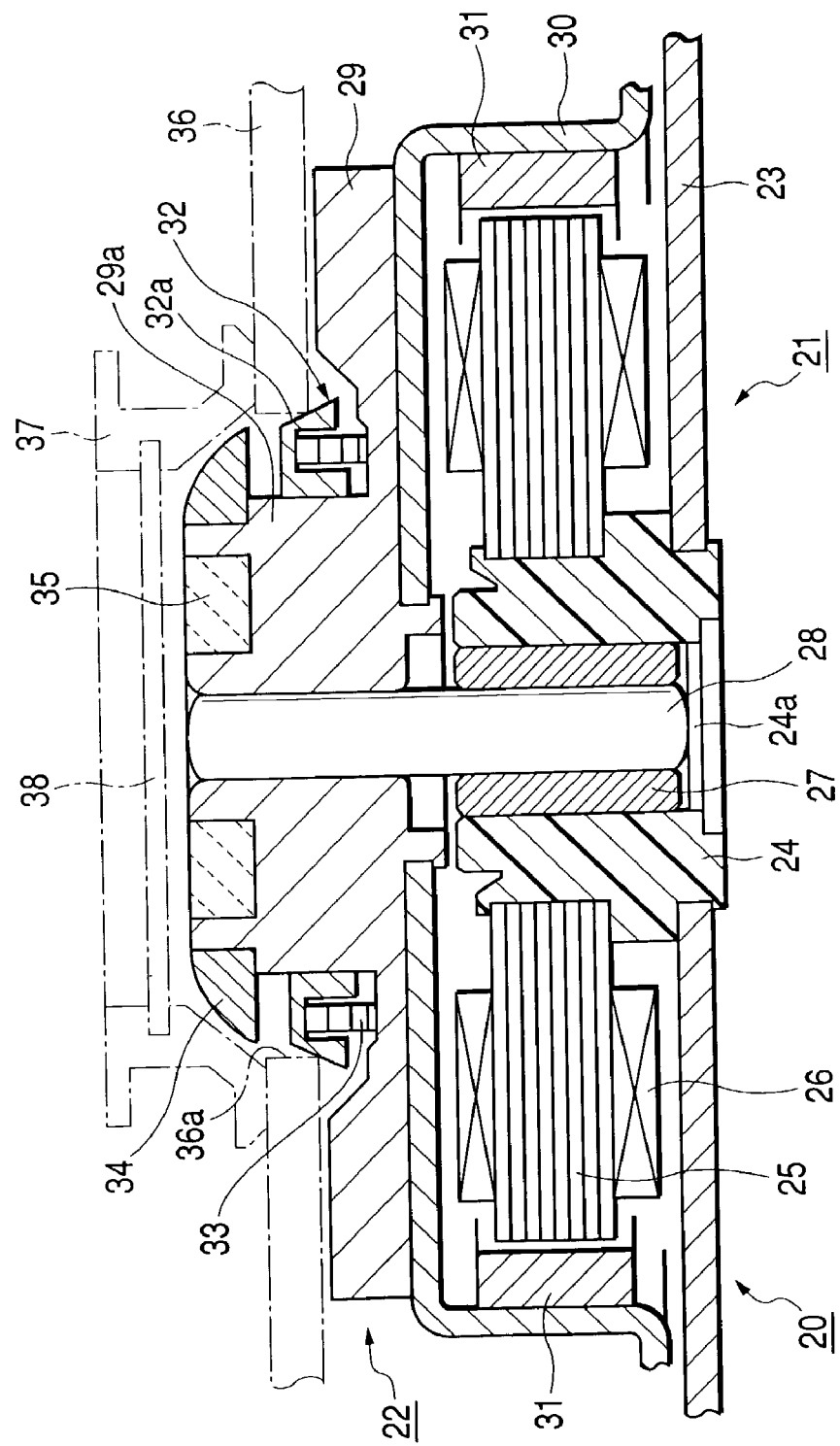
FIG. 4 is a longitudinal sectional view showing an example of the conventional spindle motor.

Further, since the stopper 24 shown in FIG. 4 in the conventional motor does not have to be used herein, the assembly time can also be decreased.

FIG. 2C cited previously shows the second embodiment of the spindle motor according to the present invention, in which the urging member 17 replaces the urging member 14 shown in FIGS. 2A and 2B and is constructed in structure in which projections 17a of an arcuate section and spherical outer periphery are formed at the tops of the respective peaks (valleys) 14a.

In this case, the vertices of the small projections 17a are brought into contact with the flat portion 10d of the turn table 10 and the groove portion 13b of the aligning member 13, which can suppress the fluctuation of the aligning member 13 relative to the turn table 10 and ensure smoother vertical motion of the aligning member, as compared with the line or surface contact case by means of the urging member 14.

As described above, the present invention offered the configuration wherein the urging member was constructed of the single annular spring material with the three peaks of wave shape at equal intervals, and thus has permitted the provision of the spindle motor capable of meeting the demands for higher accuracy of positioning of the optical disk while achieving the decrease in size and thickness, as compared with the conventional motors, in correlation with the housing, the turn table, the rotor yoke, the aligning member, and so on.

What is claimed is:

1. A spindle motor adapted to be loaded with a disk provided with an attracted plate and to rotate the disk, which comprises:
    a turn table having a flange portion on a front surface of which the disk is to be mounted and on a back surface of which a rotor yoke is supported, and a cylindrical portion a distal end of which is to be opposed to the attracted plate, the turn table being supported on a housing of a stator through a rotational shaft;
    an attraction magnet fixed to the distal end of the cylindrical portion of the turn table, and an aligning member an inner periphery of which is engaged with an outer periphery of the cylindrical portion and an outer periphery of which is to be brought into contact with an inner periphery of a center hole of the disk to align the disk; and
    an urging member interposed between the aligning member and the flange portion of the turn table to urge the aligning member by a restoration force;
    wherein the urging member is comprised of an annular spring material with a plurality of peaks in a wave shape.

2. The spindle motor according to claim 1, wherein a distal end portion of the housing extends into the cylindrical portion of the turn table.

3. The spindle motor according to claim 1, wherein a regulating portion for determining the radial position of the urging member is provided in at least one of the flange portion of the turn table and the aligning member.

4. The spindle motor according to claim 1, wherein the urging member is structured so that the peaks are in contact with the flange portion of the turn table and the aligning member at each of three positions disposed at equal intervals.

5. The spindle motor according to claim 1, wherein the urging member is a thin plate spring of a nonmagnetic metal.

* * * * *

UNITED STATES PATENT AND TRADEMARK OFFICE
CERTIFICATE OF CORRECTION

| | | |
|---|---|---|
| PATENT NO. | : 7,002,268 B2 | Page 1 of 1 |
| APPLICATION NO. | : 10/195413 | |
| DATED | : February 21, 2006 | |
| INVENTOR(S) | : Nagatsuka | |

It is certified that error appears in the above-identified patent and that said Letters Patent is hereby corrected as shown below:

ON THE TITLE PAGE
At Item (57), Abstract, line 3, "turn table" should read --turntable--.
Line 7, "turn table" should read --turntable--.
Line 10, "turn table," should read --turntable,--.

COLUMN 6
Line 15, "turn table" should read --turntable--.
Line 19, "turn table" should read --turntable--.
Line 22, "turn table," should read --turntable,--.
Line 29, "turn table" should read --turntable--.
Line 30, "force;" should read --force,--.
Line 36, "turn table." should read --turntable.--.
Line 40, "turn table" should read --turntable--.
Line 43, "turn table" should read --turntable--.

Signed and Sealed this

Nineteenth Day of June, 2007

JON W. DUDAS
*Director of the United States Patent and Trademark Office*